(12) United States Patent
Lu et al.

(10) Patent No.: US 12,124,644 B2
(45) Date of Patent: Oct. 22, 2024

(54) MOUSE PAD DEVICE

(71) Applicant: DEXIN CORPORATION, New Taipei (TW)

(72) Inventors: Ho-Lung Lu, New Taipei (TW); Ming-Hsun Tsai, Taipei (TW); Pai-Yang Chou, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 18/419,485

(22) Filed: Jan. 22, 2024

(65) Prior Publication Data
US 2024/0184385 A1 Jun. 6, 2024

Related U.S. Application Data

(62) Division of application No. 17/337,429, filed on Jun. 3, 2021, now Pat. No. 11,921,941.

(30) Foreign Application Priority Data

Nov. 11, 2020 (TW) ................. 109139321

(51) Int. Cl.
  *G06F 3/039* (2013.01)
  *G06F 1/26* (2006.01)
  *H02J 50/10* (2016.01)
(52) U.S. Cl.
  CPC .............. *G06F 3/0395* (2013.01); *G06F 1/26* (2013.01); *H02J 50/10* (2016.02)

(58) Field of Classification Search
  CPC .......... G06F 3/0395; G06F 1/26; G06F 3/039; H02J 50/10; H02J 50/402; H02J 50/50; H02J 50/20; H02J 50/12
  See application file for complete search history.

(56) References Cited

U.S. PATENT DOCUMENTS

| | | | |
|---|---|---|---|
| 9,368,274 B2* | 6/2016 | Xu | H02J 50/402 |
| 2013/0293025 A1* | 11/2013 | Xu | H02J 50/402 |
| | | | 307/104 |
| 2013/0307347 A1* | 11/2013 | Davila | H02J 50/90 |
| | | | 307/104 |
| 2020/0412157 A1* | 12/2020 | Vlasov | H02J 50/80 |
| 2022/0083150 A1* | 3/2022 | Lu | G06F 3/021 |
| 2022/0103014 A1* | 3/2022 | Lu | G06F 3/03543 |
| 2022/0244796 A1* | 8/2022 | Lu | H02J 50/50 |
| 2023/0393772 A1* | 12/2023 | Benisty | G06F 3/067 |

\* cited by examiner

*Primary Examiner* — Stacy Whitmore
(74) *Attorney, Agent, or Firm* — Li & Cai Intellectual Property Office

(57) ABSTRACT

A mouse pad device is provided. The mouse pad device includes a mouse pad body, a first mouse pad power control circuit, a first mouse pad primary resonant circuit, and a first mouse pad secondary resonant circuit. The first mouse pad power control circuit is electrically connected to a first external power. The first mouse pad primary resonant circuit receives a first operating power from the first mouse pad power control circuit, and converts the first operating power into a first wireless power. The first mouse pad secondary resonant circuit receives the first wireless power from the first mouse pad primary resonant circuit and converts the first wireless power into a second wireless power. The first mouse pad primary resonant circuit and the first mouse pad secondary resonant circuit are arranged in the mouse pad body.

3 Claims, 5 Drawing Sheets

MOUSE PAD DEVICE

CROSS-REFERENCE TO RELATED PATENT APPLICATION

This application is a divisional application of the U.S. patent application Ser. No. 17/337,429, filed on Jun. 3, 2021, and entitled "MOUSE PAD DEVICE" now pending, the entire disclosures of which are incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a mouse pad device, and more particularly to a mouse pad device having a wireless charging function.

BACKGROUND OF THE DISCLOSURE

Currently, most conventional keyboard devices and conventional mouse devices have a wireless signal transmission function, and an area of a conventional mouse pad device has gradually become sufficient for both a keyboard device and a mouse device to be disposed thereon, in replacement of a desk mat.

Therefore, it has become an important issue in the industry to provide a mouse pad device that serves as a continuous power source for the keyboard device and the mouse device.

SUMMARY OF THE DISCLOSURE

In response to the above-referenced technical inadequacy, the present disclosure provides a mouse pad device.

In one aspect, the present disclosure provides a mouse pad device for a mouse device and a keyboard device to be disposed on an operating surface thereof for being operated. The mouse pad device includes a mouse pad body, a first mouse pad power control circuit, a first mouse pad primary resonant circuit, and a first mouse pad secondary resonant circuit. The first mouse pad power control circuit is electrically connected to a first external power. The first mouse pad primary resonant circuit is electrically connected to the first mouse pad power control circuit and receives a first operating power from the first mouse pad power control circuit, and the first mouse pad primary resonant circuit converts the first operating power into a first wireless power. The first mouse pad secondary resonant circuit receives the first wireless power from the first mouse pad primary resonant circuit and converts the first wireless power into a second wireless power. The first mouse pad primary resonant circuit and the first mouse pad secondary resonant circuit are arranged in the mouse pad body. The first mouse pad primary resonant circuit provides the first wireless power to the mouse device, and the first mouse pad secondary resonant circuit provides the second wireless power to the keyboard device.

One of the beneficial effects of the mouse pad device of the present disclosure is that the mouse pad device is able to provide wireless power to the keyboard device and the mouse device according to actual requirements, which is not only more convenient than a wired power supply, but also increases user experiences.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
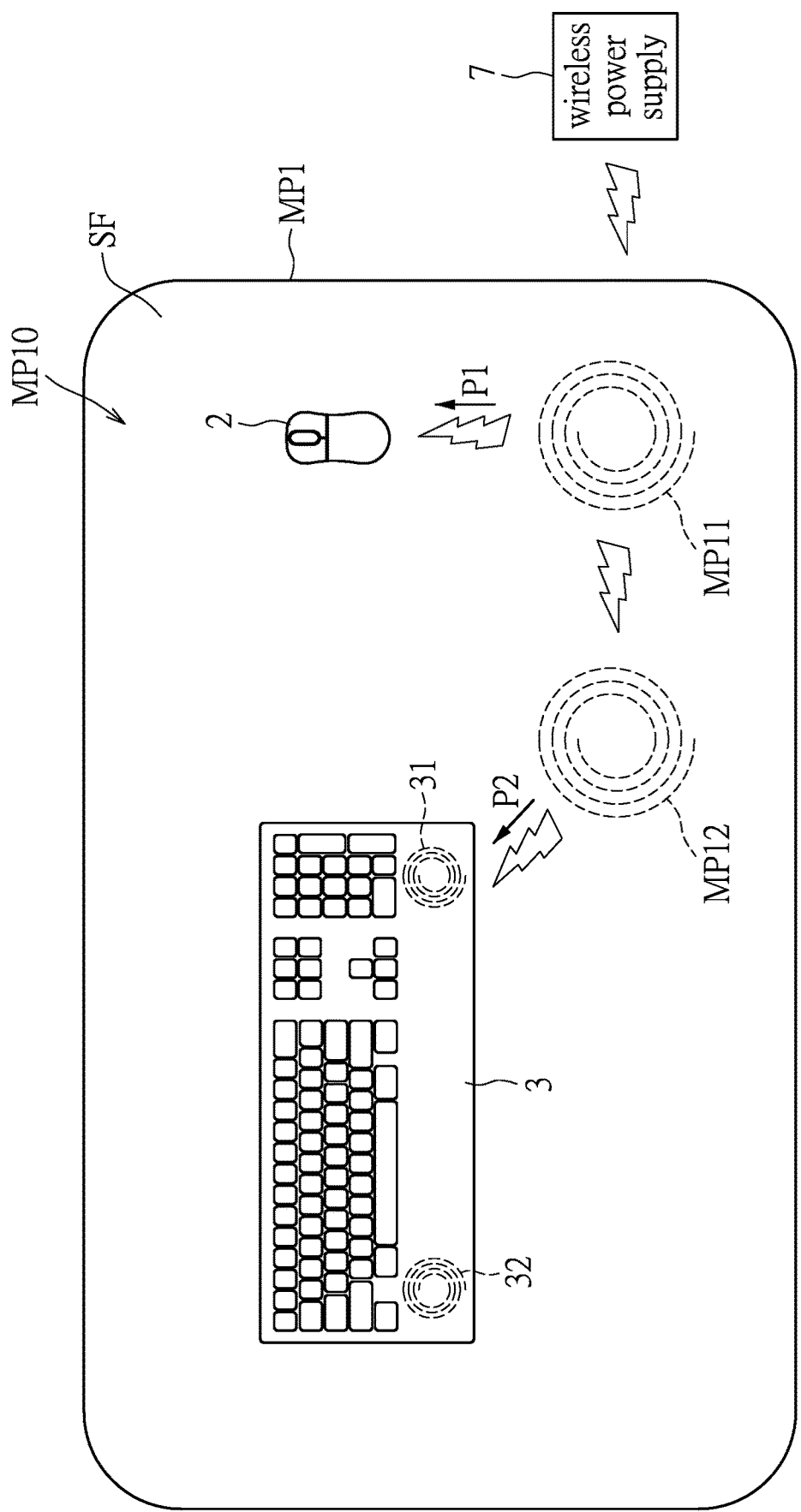
FIG. 1 is a schematic view of a mouse pad device in cooperation with a mouse device and a keyboard device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1, FIG. 1 is a schematic view of a mouse pad device in cooperation with a mouse device and a keyboard device according to a first embodiment of the present disclosure.

In the first embodiment, a mouse device 2 and a keyboard device 3 are disposed on an operating surface SF of a mouse pad device MP1 for being operated.

The mouse pad device MP1 includes a mouse pad body MP10, a first mouse pad secondary resonant circuit MP11, and a second mouse pad secondary resonant circuit MP12. The first mouse pad secondary resonant circuit MP11 and the second mouse pad secondary resonant circuit MP12 are both arranged in the mouse pad body MP10. The first mouse pad secondary resonant circuit MP11 is used to receive an external wireless power from a wireless power supply 7.

The second mouse pad secondary resonant circuit MP12 is used to receive a relay wireless power from the first mouse pad secondary resonant circuit MP11. That is to say, a wireless power received by the first mouse pad secondary resonant circuit MP11 can be relayed to the second mouse pad secondary resonant circuit MP12.

The first mouse pad secondary resonant circuit MP11 and the second mouse pad secondary resonant circuit MP12 are both a secondary resonant circuit. That is to say, instead of actively transmitting power, the first mouse pad secondary resonant circuit MP11 and the second mouse pad secondary resonant circuit MP12 passively receive power first, and then transmit the received power to electronics needing to be charged or other secondary resonant circuits. In other words, the secondary resonant circuit can only be used for relay power transmission.

In addition, in the present disclosure, a primary resonant circuit and a secondary resonant circuit can operate cooperatively with each other. The primary resonant circuit can be electrically connected to a power source, and then an electromagnetic wireless power converted from a power provided by the power source can be transmitted to the secondary resonant circuit or the primary resonant circuit. That is to say, the primary resonant circuit can transmit or receive power.

In the first embodiment, the first mouse pad secondary resonant circuit MP11 is used to provide a first wireless power P1 to the mouse device 2. The second mouse pad secondary resonant circuit MP12 provides a second wireless power P2 to the keyboard device 3 according to the relay wireless power. That is to say, the first mouse pad secondary resonant circuit MP11 and the second mouse pad secondary resonant circuit MP12 provide the first wireless power P1 and the second wireless power P2 to the mouse device 2 and the keyboard device 3, respectively.

The keyboard device 3 includes a first keyboard secondary resonant circuit 31 and a second keyboard secondary resonant circuit 32. The first keyboard secondary resonant circuit 31 and the second keyboard secondary resonant circuit 32 are arranged on two opposite sides of the keyboard device 3.

The keyboard device 3 can switch between the first keyboard secondary resonant circuit 31 and the second keyboard secondary resonant circuit 32 for receiving wireless power, according to a relative relation between positions of the first keyboard secondary resonant circuit 31 and the second keyboard secondary resonant circuit 32 and positions of the first mouse pad secondary resonant circuit MP11 and the second mouse pad secondary resonant circuit MP12 of the mouse pad MP1.

That is to say, the keyboard device 3 can detect a magnitude of a current received by the first keyboard secondary resonant circuit 31 and the second keyboard secondary resonant circuit 32, and can switch between the first keyboard secondary resonant circuit 31 and the second keyboard secondary resonant circuit 32, so as to receive power provided by the mouse pad device MP1.

In addition, charging coils of the keyboard device 3 and the mouse device 2 can also be adjusted to be adapted to a left-handed user or a right-handed user. In other words, according to different positions where the keyboard device 3 and the mouse device 2 are disposed, the first mouse pad secondary resonant circuit MP11 and the second mouse pad secondary resonant circuit MP12 of the mouse pad device MP1 can respectively provide wireless power to the keyboard device 3 and the mouse device 2. In another embodiment, the first mouse pad secondary resonant circuit MP11 can provide wireless power to the mouse device 2, and the second mouse pad secondary resonant circuit MP12 can provide wireless power to the keyboard device 3, but the present disclosure is not limited thereto.

Second Embodiment

Figure 2:
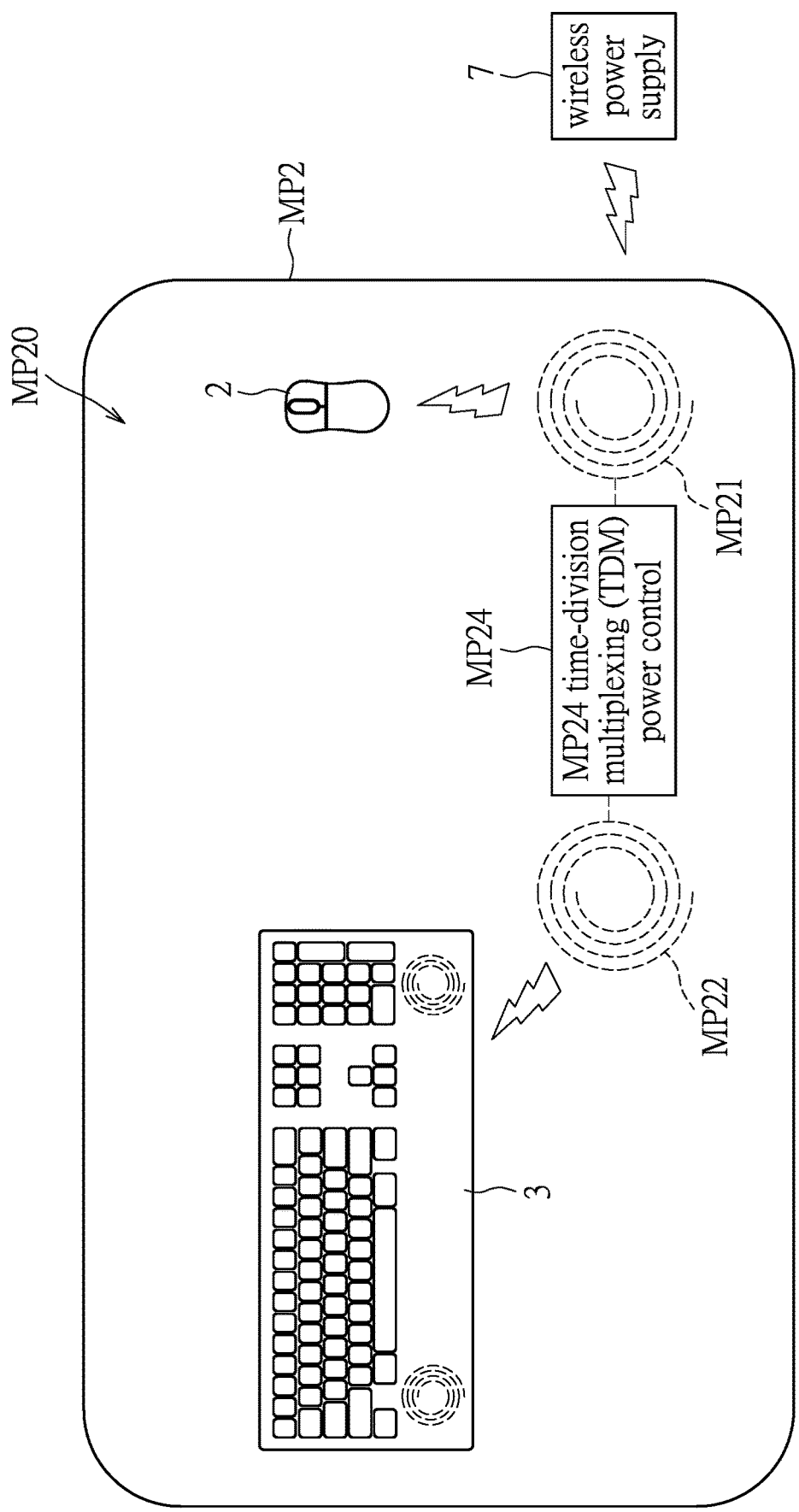
FIG. 2 is a schematic view of the mouse pad device in cooperation with the mouse device and the keyboard device according to a second embodiment of the present disclosure.

Referring to FIG. 2, FIG. 2 is a schematic view of the mouse pad device in cooperation with the mouse device and the keyboard device according to a second embodiment of the present disclosure.

In the second embodiment, a mouse device 2 and a keyboard device 3 are disposed on an operating surface SF of a mouse pad device MP2 for being operated.

The mouse pad device MP2 includes a mouse pad body MP20, a first mouse pad secondary resonant circuit MP21, a second mouse pad secondary resonant circuit MP22, and a time-division multiplexing (TDM) power control circuit MP24.

The first mouse pad secondary resonant circuit MP21 and the second mouse pad secondary resonant circuit MP22 are arranged in the mouse pad body MP20.

The first mouse pad secondary resonant circuit MP21 receives an external wireless power from a wireless power supply 7.

The second mouse pad secondary resonant circuit MP22 receives a relay wireless power from the first mouse pad secondary resonant circuit MP21 or the external wireless power from the wireless power supply 7.

That is to say, the second mouse pad secondary resonant circuit MP22 can receive the relay wireless power provided by the first mouse pad secondary resonant circuit MP21 or the external wireless power provided by the wireless power supply 7.

The first mouse pad secondary resonant circuit MP21 provides a first wireless power P1 to the mouse device 2. The second mouse pad secondary resonant circuit MP22 provides a second wireless power to the keyboard device 3 according to the relay wireless power.

The TDM power control circuit MP24 is electrically connected to the first mouse pad secondary resonant circuit MP21 and the second mouse pad secondary resonant circuit MP22. In a first time interval T1, the TDM power control circuit MP24 turns on the first mouse pad secondary resonant circuit MP21, so as to provide the first wireless power P1 to the mouse device 2. In a second time interval T2, the TDM power control circuit MP24 turns on the second mouse pad secondary resonant circuit MP22, so as to provide the second wireless power P2 to the keyboard device 3.

The keyboard device 3 includes a first keyboard secondary resonant circuit 31 and a second keyboard secondary resonant circuit 32. The first keyboard secondary resonant circuit 31 and the second keyboard secondary resonant circuit 32 are arranged on two opposite sides of the keyboard device 3. The keyboard device 3 switches between the first keyboard secondary resonant circuit 31 and the second keyboard secondary resonant circuit 32 for receiving wireless power, according to a relative relation between positions of the first keyboard secondary resonant circuit 31 and the second keyboard secondary resonant circuit 32 and positions of the first mouse pad secondary resonant circuit MP21 and the second mouse pad secondary resonant circuit MP22 of the mouse pad MP2.

In addition, charging coils of the keyboard device 3 and the mouse device 2 can be adjusted to be adapted to a left-handed user or a right-handed user. In other words, according to different positions where the keyboard device 3 and the mouse device 2 are disposed, the first mouse pad secondary resonant circuit MP21 and the second mouse pad secondary resonant circuit MP22 of the mouse pad device MP2 can respectively provide wireless power to the keyboard device 3 and the mouse device 2. In another embodiment, the first mouse pad secondary resonant circuit MP21 can provide wireless power to the mouse device 2, and the second mouse pad secondary resonant circuit MP22 can provide wireless power to the keyboard device 3, but the present disclosure is not limited thereto.

The TDM power control circuit MP24 at least includes a control circuit and a timer circuit.

Third Embodiment

Figure 3:
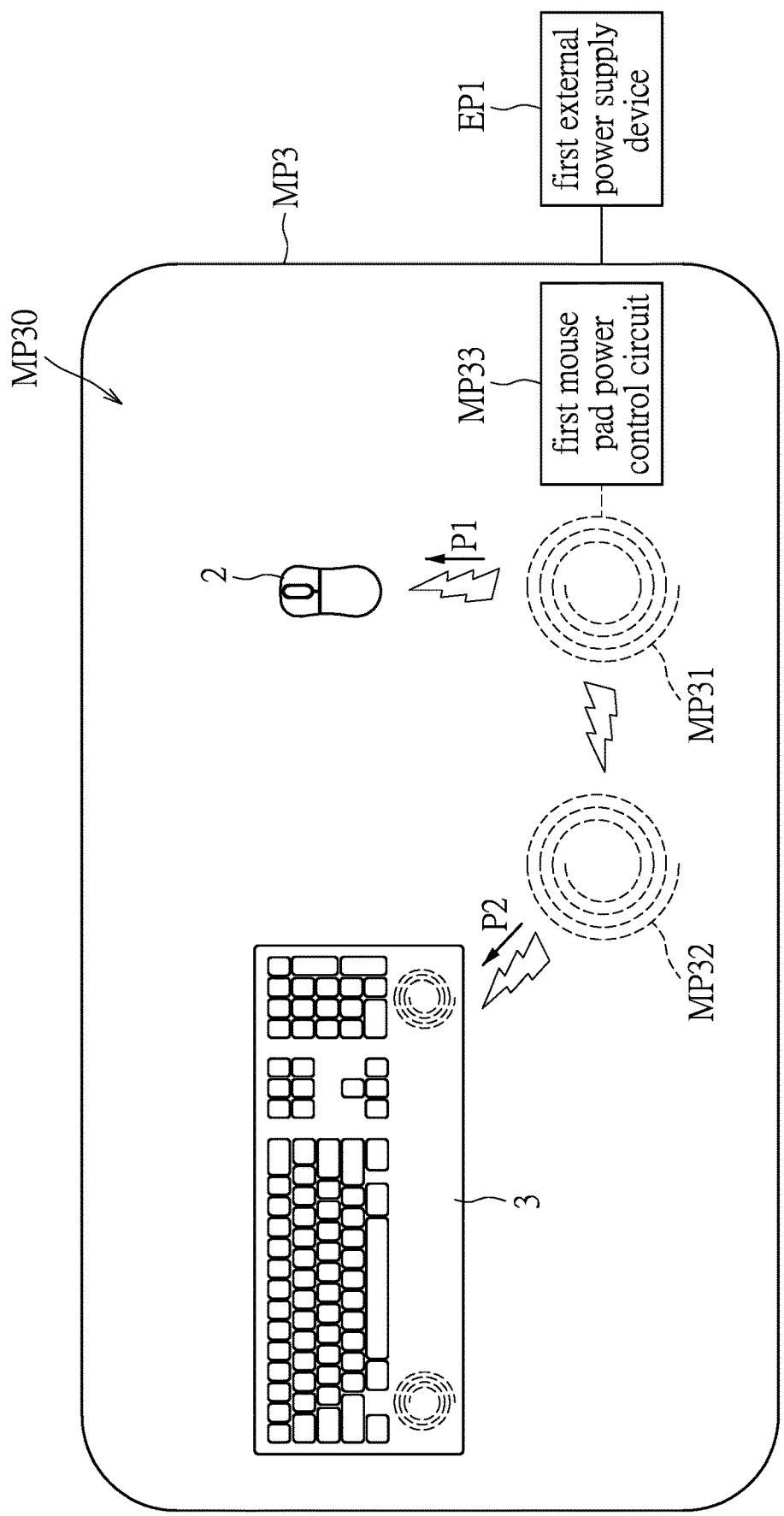
FIG. 3 is a schematic view of the mouse pad device in cooperation with the mouse device and the keyboard device according to a third embodiment of the present disclosure.

Referring to FIG. 3, FIG. 3 is a schematic view of the mouse pad device in cooperation with the mouse device and the keyboard device according to a third embodiment of the present disclosure.

In the third embodiment, a mouse device 2 and a keyboard device 3 are disposed on an operating surface SF of a mouse pad device MP3 for being operated.

The mouse pad device MP3 includes a mouse pad body MP30, a first mouse pad primary resonant circuit MP31, a first mouse pad secondary resonant circuit MP32, and a first mouse pad power control circuit MP33.

The first mouse pad power control circuit MP33 is electrically connected to a first external power supply device EP1 for receiving a first external power.

The first mouse pad primary resonant circuit MP31 is electrically connected to the first mouse pad power control circuit MP33, and receives a first operating power provided by the first mouse pad power control circuit MP33. The first mouse pad primary resonant circuit MP31 converts the first operating power into a first wireless power.

The first mouse pad secondary resonant circuit MP32 is used to receive the first wireless power from the first mouse pad primary resonant circuit MP31 and converts the first wireless power into a second wireless power. The first mouse pad primary resonant circuit MP31 and the first mouse pad secondary resonant circuit MP32 are arranged in the mouse pad body MP30.

The primary resonant circuit MP31 of the first mouse pad provides the first wireless power to the mouse device 2. The second resonant circuit MP32 of the first mouse pad provides the second wireless power to the keyboard device 3.

In addition, charging coils of the keyboard device 3 and the mouse device 2 can be adjusted to be adapted to a left-handed user or a right-handed user. In other words, according to different positions where the keyboard device 3 and the mouse device 2 are disposed, the first mouse pad primary resonant circuit MP31 and the first mouse pad secondary resonant circuit MP32 of the mouse pad device MP3 can respectively provide wireless power to the keyboard device 3 and the mouse device 2. In another embodiment, the first mouse pad primary resonant circuit MP31 can provide wireless power to the mouse device 2, and the first mouse pad secondary resonant circuit MP32 can provide wireless power to the keyboard device 3, but the present disclosure is not limited thereto.

Fourth Embodiment

Figure 4:
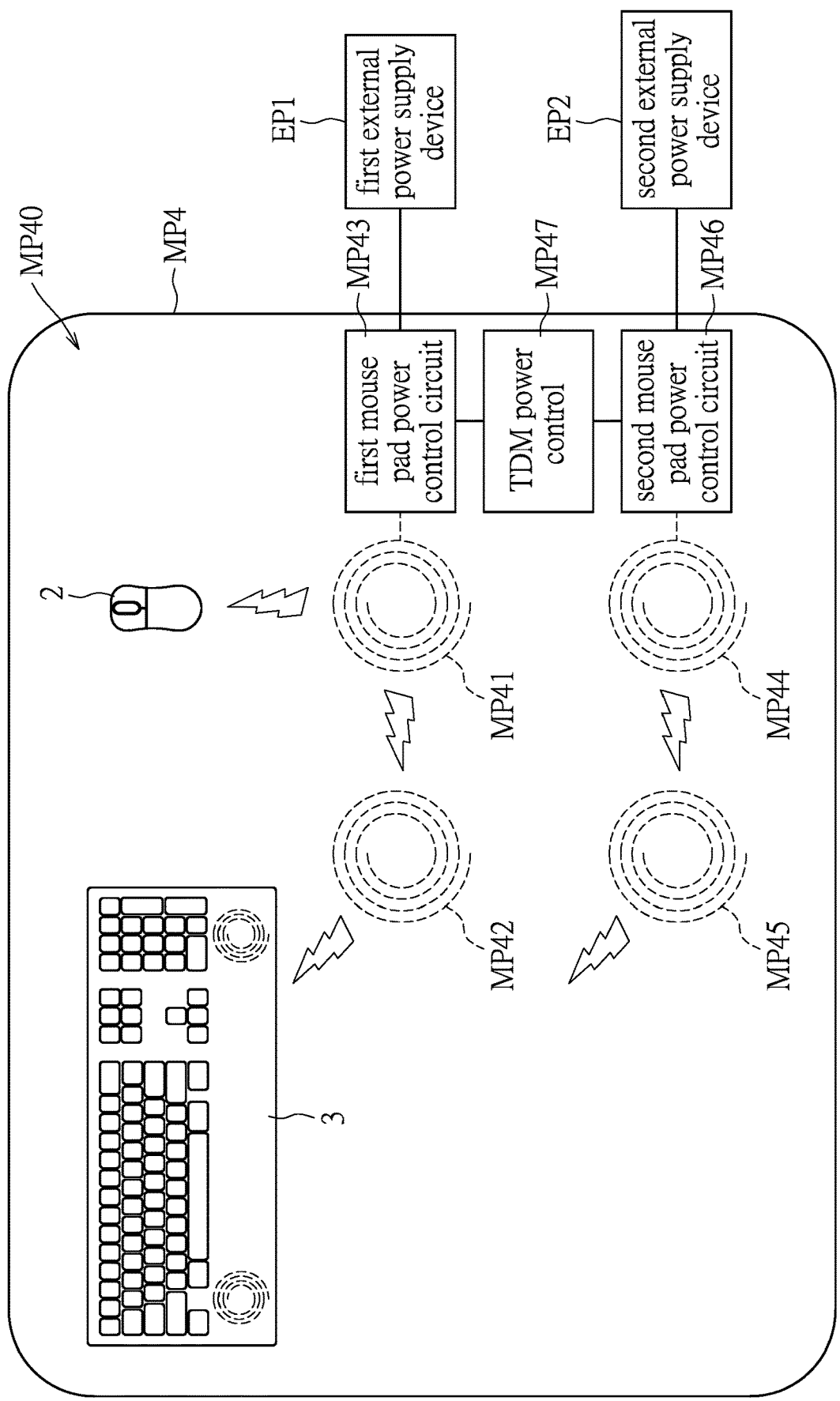
FIG. 4 is a schematic view of the mouse pad device in cooperation with the mouse device and the keyboard device according to a fourth embodiment of the present disclosure.

Referring to FIG. 4, FIG. 4 is a schematic view of the mouse pad device in cooperation with the mouse device and the keyboard device according to a fourth embodiment of the present disclosure.

The mouse pad device MP4 includes a mouse pad body MP40, a first mouse pad primary resonant circuit MP41, a first mouse pad secondary resonant circuit MP42, and a first mouse pad power control circuit MP43.

The first mouse pad power control circuit MP43 is electrically connected to a first external power supply device EP1 for receiving a first external power.

The first mouse pad primary resonant circuit MP41 is electrically connected to the first mouse pad power control circuit MP43, and receives a first operating power provided by the first mouse pad power control circuit MP43. The first mouse pad primary resonant circuit MP41 converts the first operating power into a first wireless power.

The first mouse pad secondary resonant circuit MP42 is used to receive the first wireless power from the first mouse pad primary resonant circuit MP41 and convert the first wireless power into a second wireless power. The first mouse pad primary resonant circuit MP41 and the first mouse pad secondary resonant circuit MP42 are arranged in the mouse pad body MP40.

The primary resonant circuit MP41 of the first mouse pad provides the first wireless power to the mouse device 2. The first mouse pad secondary resonant circuit MP42 provides the second wireless power to the keyboard device 3.

In addition, charging coils of the keyboard device 3 and the mouse device 2 can be adjusted to be adapted to a left-handed user or a right-handed user. In other words, according to different positions where the keyboard device 3 and the mouse device 2 are disposed, the first mouse pad primary resonant circuit MP41 and the first mouse pad secondary resonant circuit MP42 of the mouse pad device MP4 can respectively provide wireless power to the keyboard device 3 and the mouse device 2. In another embodiment, the first mouse pad primary resonant circuit MP41 can provide wireless power to the mouse device 2, and the first mouse pad secondary resonant circuit MP42 can provide wireless power to the keyboard device 3, but the present disclosure is not limited thereto.

The mouse pad device MP4 further includes a second mouse pad power control circuit MP46, a second mouse pad primary resonant circuit MP44, a second mouse pad secondary resonant circuit MP45, and a time-division multiplexing (TDM) power control circuit MP47.

The second mouse pad power control circuit MP46 is electrically connected to a second external power supply device EP2 or the first external power supply device EP1.

The second mouse pad primary resonant circuit MP44 is electrically connected to the second mouse pad power control circuit MP46. The second mouse pad primary resonant circuit MP44 is used to receive a second operating power provided by the second mouse pad power control circuit MP46. The second mouse pad primary resonant circuit MP44 can convert the second operating power into a third wireless power.

The second mouse pad secondary resonant circuit MP45 is also electrically connected to the second mouse pad power control circuit MP46.

The second mouse pad secondary resonant circuit MP45 is used to receive the third wireless power from the second mouse pad primary resonant circuit MP44 and convert the third wireless power into a fourth wireless power. The second mouse pad primary resonant circuit MP44 and the second mouse pad secondary resonant circuit MP45 are arranged in the mouse pad body MP40.

The second mouse pad primary resonant circuit MP44 provides the third wireless power to the mouse device 2. The second mouse pad secondary resonant circuit MP45 provides the fourth wireless power to the keyboard device 3.

The time division multiplexing power control circuit MP47 is electrically connected to the first mouse pad power control circuit MP43 and the second mouse pad power control circuit MP46.

The TDM power control circuit MP47 turns on the first mouse pad power control circuit MP43 in a first time interval T1, so that the first mouse pad primary resonant circuit MP41 provides the first wireless power P1 to the mouse device 2, and that the first mouse pad secondary resonant circuit MP42 provides the second wireless power P2 to the keyboard device 3.

The TDM power control circuit MP47 turns on the second mouse pad power control circuit MP46 in a second time interval T2, so that the second mouse pad primary resonant circuit MP44 provides the third wireless power to the mouse device 2, and that the second mouse pad secondary resonant circuit MP45 provides the fourth wireless power to the keyboard device 3.

In addition, similarly, charging coils of the keyboard device 3 and the mouse device 2 can be adjusted to be adapted to a left-handed user or a right-handed user. In other words, according to different positions where the keyboard device 3 and the mouse device 2 are disposed, the second mouse pad primary resonant circuit MP44 and the second mouse pad secondary resonant circuit MP45 of the mouse pad device MP4 can respectively provide wireless power to the keyboard device 3 and the mouse device 2. In another embodiment, the second mouse pad primary resonant circuit MP44 can provide wireless power to the mouse device 2, and the second mouse pad secondary resonant circuit MP45 can provide wireless power to the keyboard device 3, but the present disclosure is not limited thereto.

In the fourth embodiment, the TDM power control circuit MP47 at least includes a control circuit and a timer circuit.

Fifth Embodiment

Figure 5:
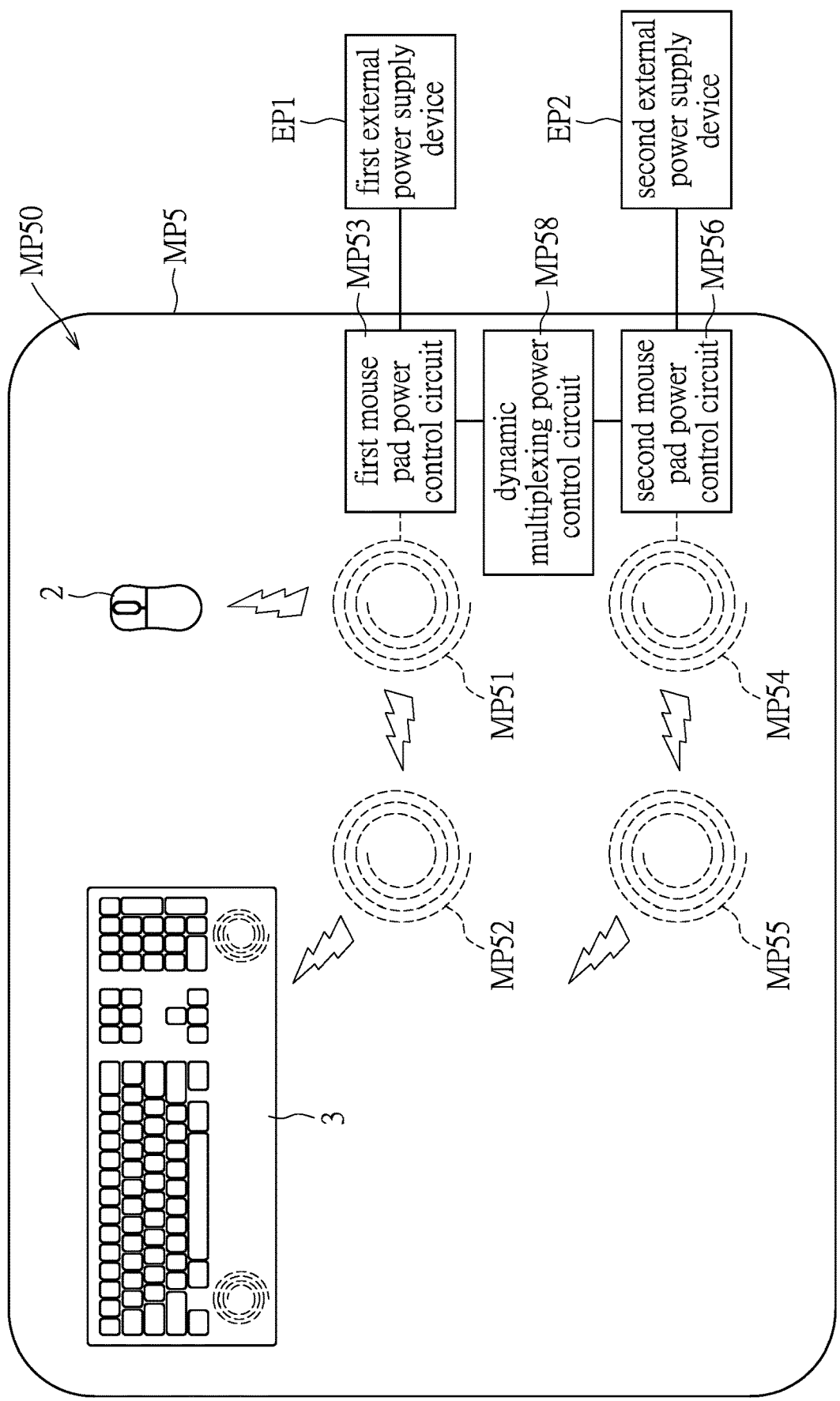
FIG. 5 is a schematic view of the mouse pad device in cooperation with the mouse device and the keyboard device according to a fifth embodiment of the present disclosure.

Referring to FIG. 5, FIG. 5 is a schematic view of the mouse pad device in cooperation with the mouse device and the keyboard device according to a fifth embodiment of the present disclosure.

Similar to the mouse pad device MP4 in the fourth embodiment, a mouse pad device MP5 in the fifth embodiment includes a mouse pad body MP50, a first mouse pad primary resonant circuit MP51, a first mouse pad secondary resonant circuit MP52, a first mouse pad power control circuit MP53, a second mouse pad primary resonant circuit MP54, a second mouse pad secondary resonant circuit MP55, and a second mouse pad power control circuit MP56.

The first mouse pad power control circuit MP53 is electrically connected to a first external power supply device EP1 for receiving a first external power.

The first mouse pad primary resonant circuit MP51 is electrically connected to the first mouse pad power control circuit MP53, and receives a first working power provided by the first mouse pad power control circuit MP53. The first mouse pad primary resonant circuit MP51 converts the first operating power into a first wireless power. The first mouse pad secondary resonant circuit MP52 is used to receive the first wireless power from the first mouse pad primary resonant circuit MP51 and convert the first wireless power into a second wireless power. The first mouse pad primary resonant circuit MP51 and the first mouse pad secondary resonant circuit MP52 are arranged in the mouse pad body MP50.

The primary resonant circuit MP51 of the first mouse pad provides the first wireless power to the mouse device 2. The second resonant circuit MP52 of the first mouse pad provides the second wireless power to the keyboard device 3.

In addition, charging coils of the keyboard device 3 and the mouse device 2 can be adjusted to be adapted to a left-handed user or a right-handed user. In other words, according to different positions where the keyboard device 3 and the mouse device 2 are disposed, the first mouse pad primary resonant circuit MP51 and the first mouse pad secondary resonant circuit MP52 of the mouse pad device MP5 can respectively provide wireless power to the keyboard device 3 and the mouse device 2. In another embodiment, the first mouse pad primary resonant circuit MP51 can provide wireless power to the mouse device 2, and the first mouse pad secondary resonant circuit MP52 can provide wireless power to the keyboard device 3, but the present disclosure is not limited thereto. In the fifth embodiment, the mouse pad device MP5 further includes a dynamic multiplexing power control circuit MP58. The second mouse pad power control circuit MP56 is electrically connected to a second external power supply device EP2 or the first external power supply device EP1.

The second mouse pad primary resonant circuit MP54 is electrically connected to the second mouse pad power control circuit MP56, and receives a second working power provided by the second mouse pad power control circuit MP56. The second mouse pad primary resonant circuit MP54 converts the second operating power into a third wireless power.

The second mouse pad secondary resonant circuit MP55 is also electrically connected to the second mouse pad power control circuit MP56 to receive the third wireless power from the second mouse pad primary resonant circuit MP54 and converts the third wireless power into a fourth wireless power. The second mouse pad primary resonant circuit MP54 and the second mouse pad secondary resonant circuit MP55 are arranged in the mouse pad body MP50. The second mouse pad primary resonant circuit MP54 provides third wireless power to the mouse device 2. The second mouse pad secondary resonant circuit MP55 provides the fourth wireless power to the keyboard device 3.

The dynamic multiplexing power control circuit MP58 is electrically connected to the first mouse pad power control circuit MP53 and the second mouse pad power control circuit MP56.

The dynamic multiplexing power control circuit MP58 turns on the first mouse pad power control circuit MP53 in a first time interval T1, so that the first mouse pad primary resonant circuit MP51 provides the first wireless power to the mouse device 2, and that the second resonant circuit MP52 of the first mouse pad provides the second wireless power to the keyboard device 3.

The dynamic multiplexing power control circuit MP58 turns on the second mouse pad power control circuit MP56 in a second time interval T2, so that the second mouse pad primary resonant circuit MP54 provides the third wireless power to the mouse device 2, and that the second mouse pad secondary resonant circuit MP55 provides the fourth wireless power to the keyboard device 3.

The dynamic multiplexing power control circuit MP58 adjusts a ratio between the first time interval T1 and the second time interval T2 according to an amount of movement of the mouse device 2.

In addition, similarly, charging coils of the keyboard device 3 and the mouse device 2 can be adjusted to be adapted to a left-handed user or a right-handed user. In other words, according to different positions where the keyboard device 3 and the mouse device 2 are disposed, the second mouse pad primary resonant circuit MP54 and the second mouse pad secondary resonant circuit MP55 of the mouse pad device MP5 can respectively provide wireless power to the keyboard device 3 and the mouse device 2. In another embodiment, the second mouse pad primary resonant circuit MP54 can provide wireless power to the mouse device 2, and the second mouse pad secondary resonant circuit MP55 can provide wireless power to the keyboard device 3, but the present disclosure is not limited thereto.

In the fifth embodiment, the dynamic multiplexing power control circuit MP58 at least includes a control circuit and a comparator circuit.

BENEFICIAL EFFECTS OF THE EMBODIMENTS

One of the beneficial effects of the mouse pad device of the present disclosure is that the mouse pad device is able to provide a wireless power to the keyboard device and the mouse device according to actual requirements, which is not only more convenient than a wired power supply, but also increases user experiences.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A mouse pad device for a mouse device and a keyboard device to be disposed on an operating surface thereof for being operated, the mouse pad device comprising:
   a mouse pad body;
   a first mouse pad power control circuit electrically connected to a first external power;
   a first mouse pad primary resonant circuit electrically connected to the first mouse pad power control circuit and receiving a first operating power from the first mouse pad power control circuit, and the first mouse pad primary resonant circuit converting the first operating power into a first wireless power; and
   a first mouse pad secondary resonant circuit receiving the first wireless power from the first mouse pad primary resonant circuit and converting the first wireless power into a second wireless power, the first mouse pad primary resonant circuit and the first mouse pad secondary resonant circuit being arranged in the mouse pad body;
   wherein the first mouse pad primary resonant circuit provides the first wireless power to the mouse device, and the first mouse pad secondary resonant circuit provides the second wireless power to the keyboard device.

2. The mouse pad device according to claim 1, further comprising:
   a second mouse pad power control circuit electrically connected to a second external power or the first external power;
   a second mouse pad primary resonant circuit electrically connected to the second mouse pad power control circuit and receiving a second operating power from the second mouse pad power control circuit, and the second mouse pad primary resonant circuit converting the second operating power into a third wireless power;
   a second mouse pad secondary resonant circuit electrically connected to the second mouse pad power control circuit, receiving the third wireless power from the second mouse pad primary resonant circuit, and converting the third wireless power into a fourth wireless power, the second mouse pad primary resonant circuit and the second mouse pad secondary resonant circuit being arranged in the mouse pad body, wherein the second mouse pad primary resonant circuit provides the third wireless power to the mouse device, and the second mouse pad secondary resonant circuit provides the fourth wireless power to the keyboard device; and
   a time-division multiplexing (TDM) power control circuit electrically connected to the first mouse pad power control circuit and the second mouse pad power control circuit;
   wherein the TDM power control circuit turns on the first mouse pad power control circuit in a first time interval, so that the first mouse pad primary resonant circuit provides the first wireless power to the mouse device, and that the first mouse pad secondary resonant circuit provides the second wireless power to the keyboard device;
   wherein the TDM power control circuit turns on the second mouse pad power control circuit in a second time interval, so that the second mouse pad primary resonant circuit provides the third wireless power to the mouse device, and that the second mouse pad secondary resonant circuit provides the fourth wireless power to the keyboard device.

3. The mouse pad device according to claim 1, further comprising:
   a second mouse pad power control circuit electrically connected to a second external power or the first external power;
   a second mouse pad primary resonant circuit electrically connected to the second mouse pad power control circuit and receiving a second operating power from the second mouse pad power control circuit, and the second mouse pad primary resonant circuit converting the second operating power into a third wireless power;

a second mouse pad secondary resonant circuit receiving the third wireless power from the second mouse pad primary resonant circuit and converting the third wireless power into a fourth wireless power, the second mouse pad primary resonant circuit and the second mouse pad secondary resonant circuit being arranged in the mouse pad body, wherein the second mouse pad primary resonant circuit provides the third wireless power to the mouse device, and the second mouse pad secondary resonant circuit provides the fourth wireless power to the keyboard device; and a dynamic multiplexing power control circuit electrically connected to the first mouse pad power control circuit and the second mouse pad power control circuit;

wherein the dynamic multiplexing power control circuit turns on the first mouse pad power control circuit in a first time interval, so that the first mouse pad primary resonant circuit provides the first wireless power to the mouse device, and that the first mouse pad secondary resonant circuit provides the second wireless power to the keyboard device;

wherein the dynamic multiplexing power control circuit turns on the second mouse pad power control circuit in a second time interval, so that the second mouse pad primary resonant circuit provides the third wireless power to the mouse device, and that the second mouse pad secondary resonant circuit provides the fourth wireless power to the keyboard device;

wherein the dynamic multiplexing power control circuit adjusts a ratio between the first time interval and the second time interval according to an amount of movement of the mouse device.

\* \* \* \* \*